W. ESTY.

Assignor to C. A., J. T. & F. E. BUSIEL.

STOCKING.

No. 11,222. Reissued Feb. 2, 1892.

WITNESSES,
R. E. Grant
G. E. Tucker

INVENTOR
William Esty,
By his Attorney
L. S. Brown.

UNITED STATES PATENT OFFICE.

WILLIAM ESTY, OF LACONIA, NEW HAMPSHIRE, ASSIGNOR TO CHARLES A. BUSIEL, JOHN T. BUSIEL, AND FRANK E. BUSIEL, OF SAME PLACE.

STOCKING.

SPECIFICATION forming part of Reissued Letters Patent No. 11,222, dated February 2, 1892.

Original No. 247,326, dated September 20, 1881. Application for reissue filed December 22, 1884. Serial No. 151,013.

*To all whom it may concern:*

Be it known that I, WILLIAM ESTY, of Laconia, in the county of Belknap and State of New Hampshire, have invented an Improved Stocking; and I do hereby declare the following to be a full, clear, and exact description of the invention, such as will enable others skilled in the art to which it pertains to make and use it, reference being had to the accompanying drawings, which form part of this specification.

My invention consists in a stocking having the leg knit down to the point where the foot commences, the foot and heel portions knit in one flat web with selvage edges and with suitable whole bulged projections for the heel and toe, the ends of the foot portions being united to the leg portion, and the selvage edges of the said foot portions being joined by seaming, as will be more fully described hereinafter.

Figure 1:
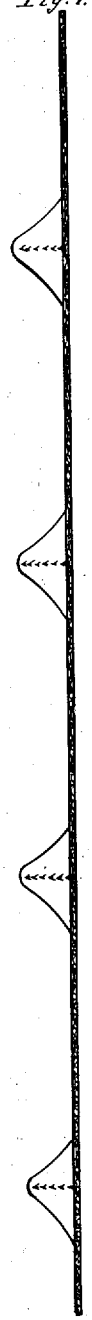
Figure 2:
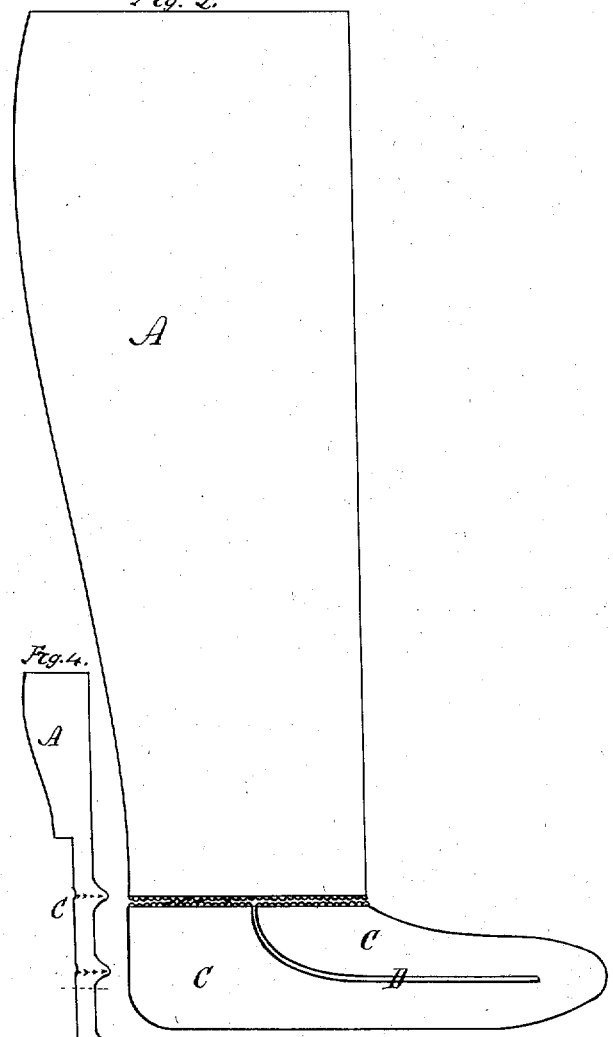
Figure 3:
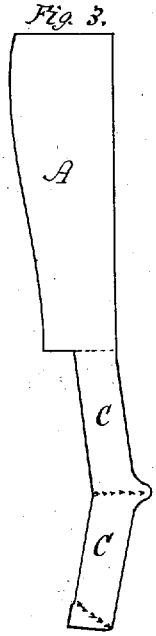
Figure 4:
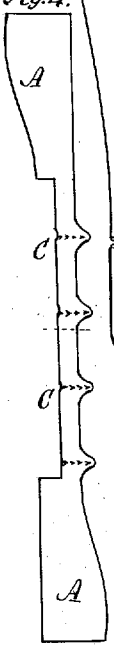

Figure 1 is an edge view of a length of webbing knit in one continuous length and out of which the foot portions of the stocking are formed. Fig. 2 is a side elevation of a leg and foot portion just ready to be joined together. Fig. 3 is a side elevation of a leg having a foot portion united at one end to it. Fig. 4 is a similar view of two legs and two feet united together in one continuous length.

A represents the leg of a stocking which is knit upon a circular machine in the usual manner. The foot portion C of the stocking is knit upon a straight machine in one continuous flat web of any desired length, in which web are formed at regular intervals apart whole bulged projections or pockets for the heels and toes. This web is cut into suitable lengths, so as to form the foot portions of the stocking, and each length is then doubled upon itself, as shown in Fig. 2, and then has each of its ends united to the bottom edges of the leg in any suitable manner so as to form a complete stocking. After the ends of the foot portion have been united to the leg portion the selvage edges D of the foot are seamed or united together in any suitable manner, and the stocking is complete.

Instead of knitting the foot portions in one long continuous web and then cutting it into lengths, as above described, a portion of the stitches on the lower edge of the leg may be run upon the needles of a footer and the foot be begun and knit from this point, as shown in Fig. 3. This knitting may be begun at the top part of the foot and end at the heel, or may be begun at the heel and end at the top part of the foot, as may be preferred.

When the foot portion is to be knit onto the leg, in order to save one taking of the work off of the machine, two foot portions may be knit in one length, and then the last end of the second foot be knit or otherwise joined to a second leg, as shown in Fig. 4. The two foot portions are then separated at the dotted line, and each stocking is then finished separately.

Having thus described my invention, I claim—

A stocking consisting of the leg, the foot portions knit in a single flat web with selvage edges and with suitable whole bulged projections for the toe and heel, the ends of the foot portions being united to the leg portion, and the selvage edges of the foot portions being united together by seaming, substantially as described.

WILLIAM ESTY.

Witnesses:
STEPHEN S. JEWETT,
GEORGE A. MORRISON.